United States Patent
Yen et al.

(10) Patent No.: US 6,832,374 B2
(45) Date of Patent: Dec. 14, 2004

(54) SYSTEM AND METHOD FOR UPDATING AN EXECUTING EXECUTABLE FILE

(75) Inventors: Hsiang Tsun Yen, Taipei (TW); Chien Sen Weng, Taipei (TW); Luke Taylor, Taipei (TW)

(73) Assignee: Synq Technology Inc., Taipei (TW)

( * ) Notice: Subject to any disclaimer, the term of this patent is extended or adjusted under 35 U.S.C. 154(b) by 506 days.

(21) Appl. No.: 09/904,857

(22) Filed: Jul. 16, 2001

(65) Prior Publication Data
US 2002/0066093 A1 May 30, 2002

(30) Foreign Application Priority Data
Sep. 14, 2000 (TW) ........................................ 89119022 A

(51) Int. Cl.[7] ................................................. G06F 9/44
(52) U.S. Cl. .................... 717/173; 709/218; 709/219; 709/203
(58) Field of Search ................................ 717/168–173; 709/203, 213, 220, 221; 707/10

(56) References Cited

U.S. PATENT DOCUMENTS

| | | | | |
|---|---|---|---|---|
| 5,295,263 A | * | 3/1994 | Kojima et al. .............. 713/100 |
| 5,953,534 A | * | 9/1999 | Romer et al. ................ 717/138 |
| 5,960,189 A | * | 9/1999 | Stupek et al. ................ 717/169 |
| 6,202,208 B1 | * | 3/2001 | Holiday, Jr. ................. 717/166 |
| 6,243,789 B1 | * | 6/2001 | Hasbun et al. .............. 711/103 |
| 6,438,621 B1 | * | 8/2002 | Kanamori et al. .......... 709/331 |
| 6,473,768 B1 | * | 10/2002 | Srivastava et al. .......... 707/101 |
| 6,631,520 B1 | * | 10/2003 | Theron et al. ............... 717/173 |

* cited by examiner

Primary Examiner—Chameli C. Das
Assistant Examiner—Chuck Kendall
(74) Attorney, Agent, or Firm—Quintero Law Office

(57) ABSTRACT

Disclosed is a system and method for updating an executing executable file. Client executes a first executable file in a first location and makes a request. Server receives the request and transfers a configuration file to client. The configuration file comprises an executable file name, and a file address corresponding to a storage apparatus. Second executable file corresponds to the executable file name, stored in storage apparatus. First executable file receives the configuration file and links to storage apparatus corresponding to the file address, downloads second executable file and stores second executable file in a second location. First executable file activates second executable file and terminates first executable file. Second executable file duplicates itself to the first location. Second executable file in the second location activates second executable file in the first location and terminates second executable file in the second location.

44 Claims, 15 Drawing Sheets

```
< program >
  < dataserver > develop1.acer121.com </ dataserver >
  < dataport > 8080 </ dataport >
  < download > /ipull/stock/program/ipull.exe; </ download />
</ program >
```

FIG. 3

SYSTEM AND METHOD FOR UPDATING AN EXECUTING EXECUTABLE FILE

REFERENCE TO RELATED APPLICATIONS

The present application claims priority to Taiwan application No. 089119022 Entitled "System and method for updating an executing executable file" filed on 14th September 2000.

BACKGROUND OF THE INVENTION

The present invention relates to the updating of an executing executable file, more particularly, it is a system and method for updating executing executable files.

In the current system, updating a program requires termination of the on-going program, substituting the old version of the executable file with a new version and re-activating the new version of the executable file.

Under client/server architecture in the prior art, the new version executable file is stored in the server over the network, which allows the client to download new executable files for a program update. As a result, when executable files on the server are updated, the server notifies the client regarding the release of new versions. When users are executing the old version of an executable file and decide to update, they must first terminate the execution of the old version executable file, link to a designated storage apparatus over a network, download the latest executable file and store the new executable file at the client. When this procedure is completed, users must re-launch the new version of the executable file.

As mentioned above, in the prior art, if the client is executing an old version executable file and wants to update then the present execution of the executable file has to be terminated and re-activated after the old version executable file is updated.

SUMMERY OF THE INVENTION

The objective of the present invention is to provide a system and method for updating executing executable files.

In a preferred embodiment, the present invention provides a system and method for updating an executing executable file. Client executes a first executable file stored in first storage location and makes a request. Server receives the request and transfers a configuration file to the client in response to the request. The configuration file comprises an executable file name, and file address which corresponds to a storage apparatus. The second executable file corresponds to the executable file name, which is stored in the storage apparatus. The first executable file at the client receives the configuration file and links to the storage apparatus which corresponds to the file address according to the file address in the configuration file, downloads the second executable file and stores the second executable file in a second storage location. It followed that the first executable file activates the second executable file and terminates the first executable file. Subsequently, the second executable file duplicates the second executable file stored in the second storage location to the first storage location. Second executable file stored in the second storage location activates the second executable file stored in the first storage location from and terminates the second executable file stored in the second storage location.

It is an advantage of the present invention that users can update old version executable file without terminating their present execution. Moreover, as the executable file is updated, the client can continue execution. As a result, execution of the executable file need not be terminated due to the update. This in turn means that users do not have to terminate the old version executable file and re-launch the executable file of the program during upgrading process.

These and other objectives of the present invention will no doubt become obvious to those of ordinary skill in the art after having read the following detailed description of the preferred embodiment, which is illustrated in the various figures and drawings.

BRIEF DESCRIPTION OF THE DRAWINGS

The following detailed description, given by way of an example and not intended to limit the invention to the embodiments described herein, will best be understood in conjunction with the accompanying drawings, in which:

FIG. 3 illustrates a diagram of a system configuration file according to the invention as shown in FIG. 1;

DETAILED DESCRIPTION OF THE INVENTION

Figure 1:
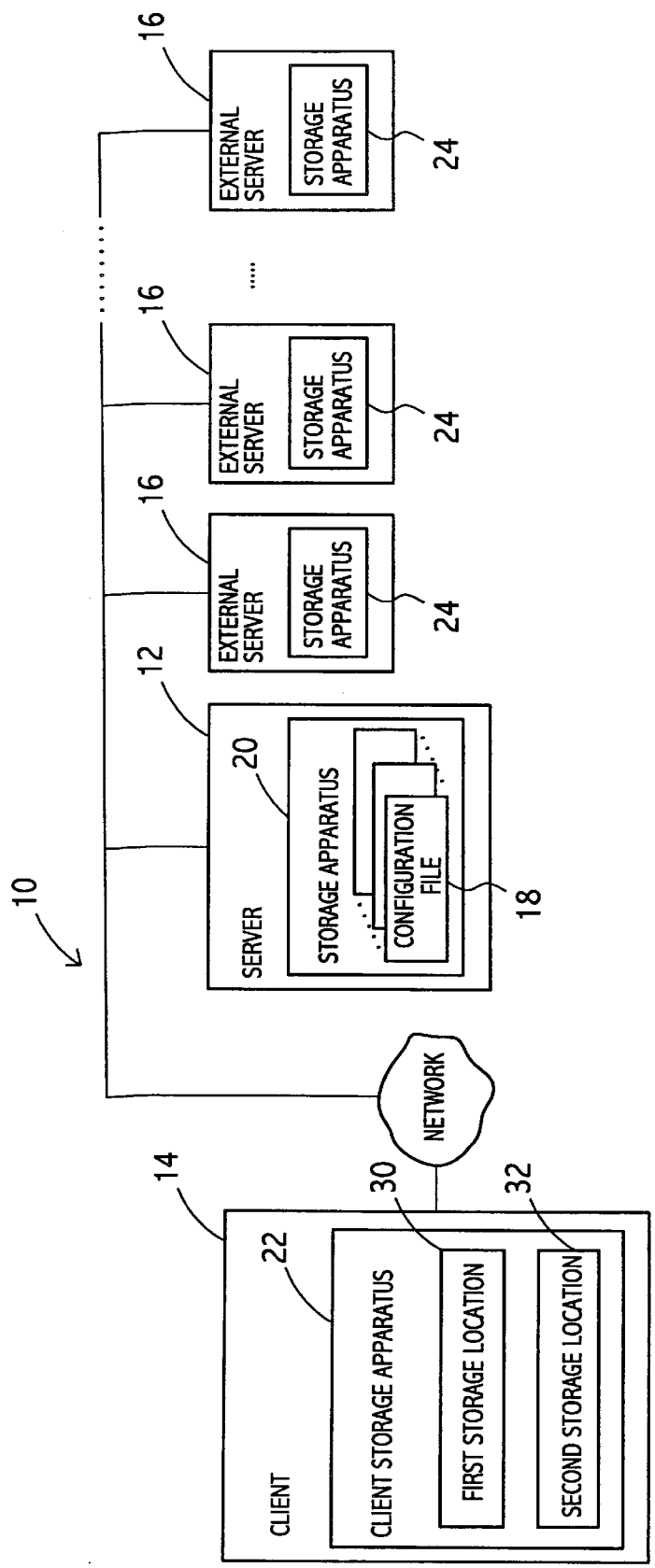
FIG. 1 illustrates a system schematic diagram of the first preferred embodiment according to the invention.
Figure 2:
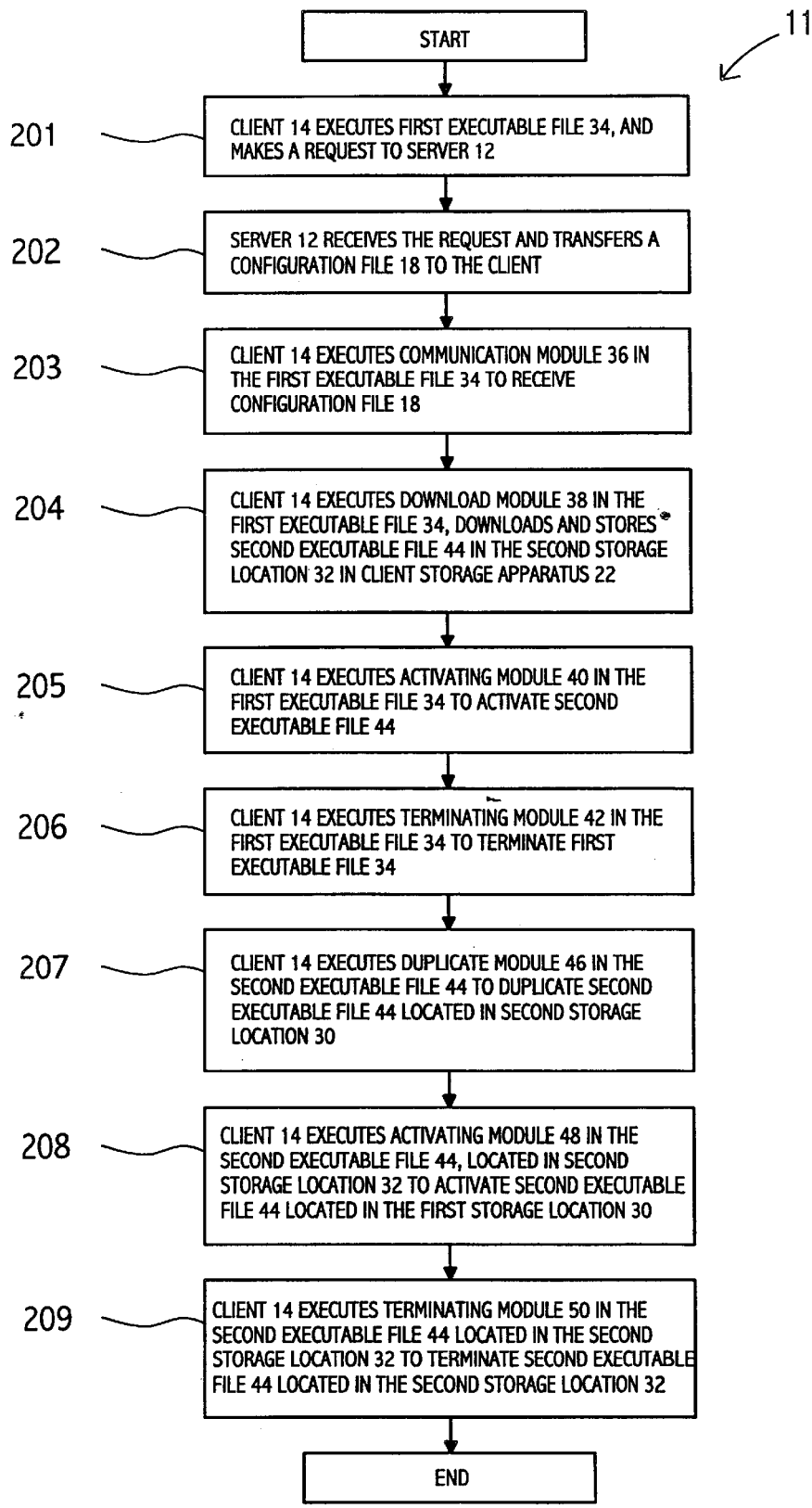
FIG. 2 illustrates a method schematic diagram of the first preferred embodiment according to the invention.
Figure 4:
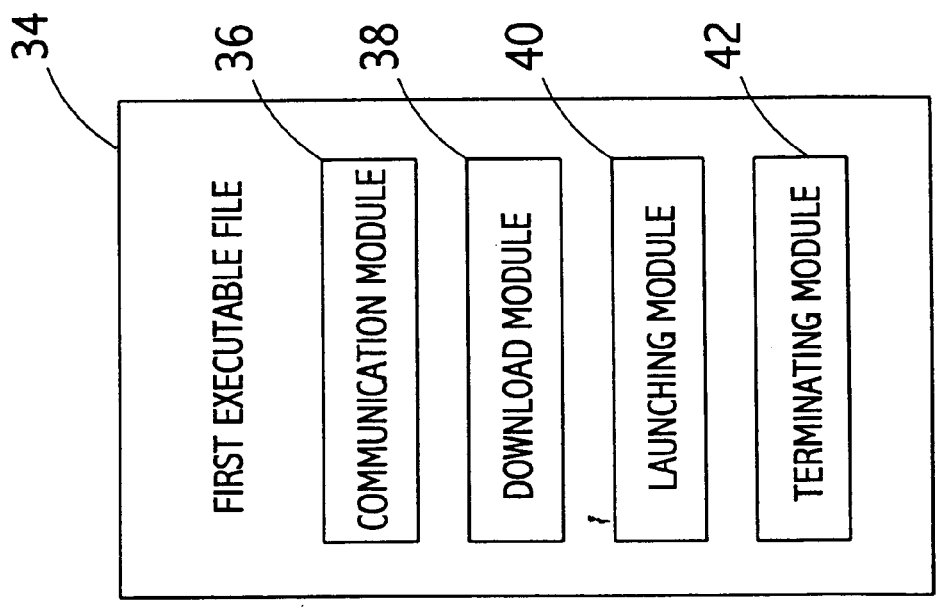
FIG. 4 illustrates a diagram of the first executable file according to the invention as shown in FIG. 1.
Figure 5:
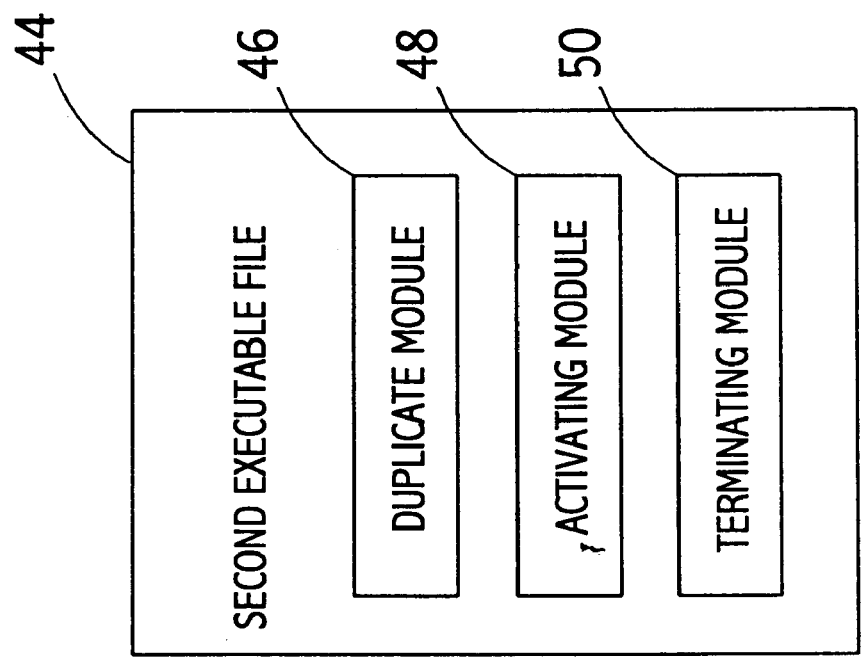
FIG. 5 illustrates a diagram of the second executable file according to the invention as shown in FIG. 1.
Figure 6:
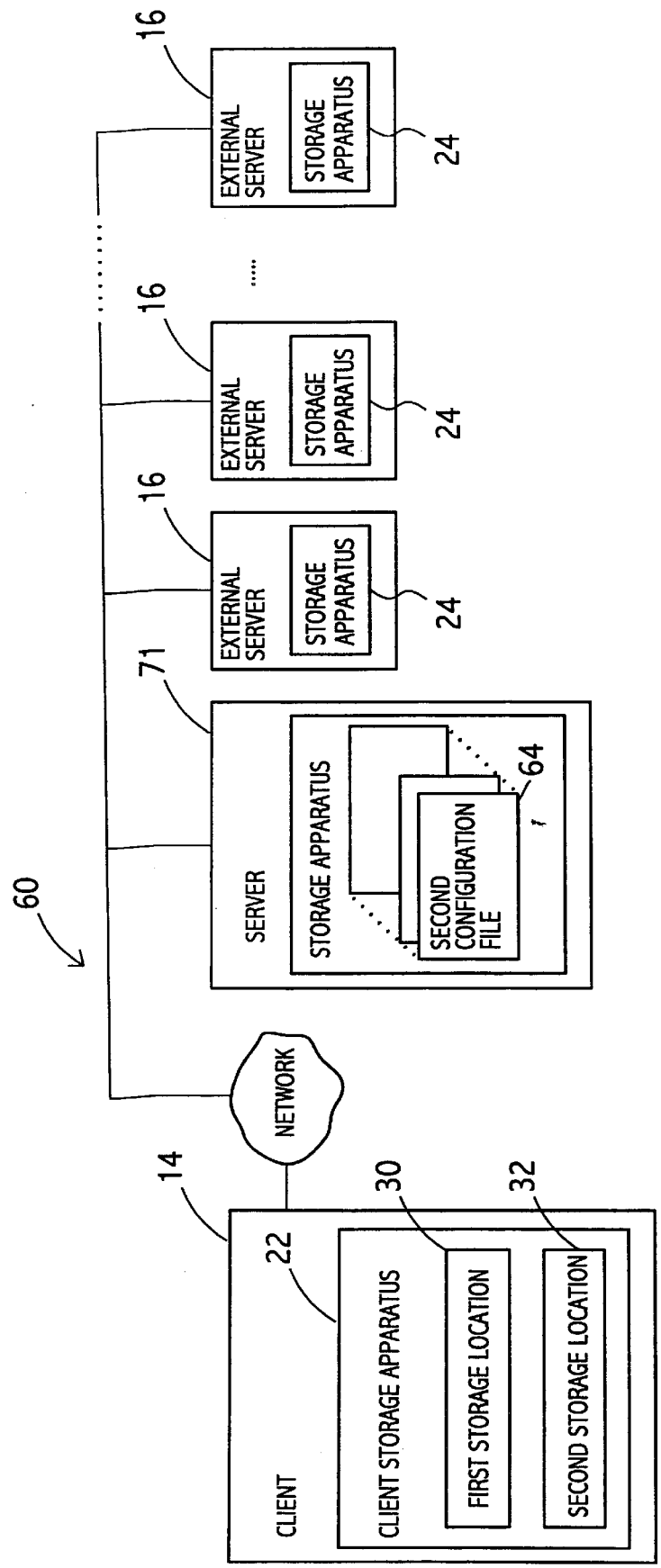
FIG. 6 illustrates a system schematic diagram of the second preferred embodiment according to the invention.

Referring to the preferred embodiment shown from FIG. 1 to FIG. 5, FIG. 1 illustrates the first preferred embodiment of system 10 according to the present invention. FIG. 2 illustrates the first preferred embodiment of method 11 according to the present invention. FIG. 3 is a diagram of the configuration file 18 of the system 10. FIG. 4 is a diagram of the first executable file 34 of the system 10. FIG. 5 is a diagram of the second executable file 44 of the system 10. System 10 comprises a server 12, a client 14, and a plurality of external servers 16.

Server 12 comprises a plurality of configuration files 18, and a storage apparatus 20. Client 14 comprises a client storage apparatus 22, and a first executable file 34 stored in the first storage location 30 of the client storage apparatus 22. Each external server 16 comprises a storage apparatus 24.

Referring to FIG. 3, each configuration file 18 comprises an executable file name 26 and a file address 28. File address 28 corresponds to storage apparatus 20 or 24. The second executable file 44, which corresponds to executable file name 26, is stored in the storage apparatus 20 or 24.

Referring to FIG. 4, the first executable file 34 comprises a communication module 36, a download module 38, a activating module 40, and a terminating module 42. As shown in FIG. 5, the second executable file 44 comprises a duplicate module 46, a activating module 48, and a terminating module 50.

As shown in FIG. 2, client 14 executes first executable file 34, and makes a request to server 12 at step 201. At step 202, server 12 receives the request and transfers a configuration file 18 to the client in response. It follows that client 14 executes the following steps.

At step 203, client 14 executes communication module 36 in the first executable file 34 to receive configuration file 18.

At step 204, client 14 executes download module 38 in the first executable file 34, links to storage apparatus 20 or 24 which corresponds to file address 28, according to file address 28 in the configuration file 18 and downloads second executable file 44, and then stores second executable file 44 in the second storage location 32 in client storage apparatus 22.

At step 205, client 14 executes activating module 40 in the first executable file 34 to activate second executable file 44.

At step 206, client 14 executes terminating module 42 in the first executable file 34 to terminate first executable file 34.

At step 207, client 14 executes duplicate module 46 in the second executable file 44 to duplicate second executable file 44 located in second storage location 32 to first storage location 30.

At step 208, client 14 executes activating module 48 in the second executable file 44, located in second storage location 32 to activate second executable file 44 located in the first storage location 30.

At step 209, client 14 executes terminating module 50 in the second executable file 44 located in the second storage location 32 to terminate second executable file 44 located in the second storage location 32.

An alternative for step 206 is to execute terminating module 50 in the second executable file 44 to terminate the first executable file 34. For step 209, an alternative is to execute the second executable file 44 in the first storage location 30. This terminates the second executable file 44 located in the second storage location 32.

Client 14 stores the configuration file 18 in the client storage apparatus 22. Configuration file 18 is either stored as an independent file in client 14, or in the operating system's registration file.

Method 11 is used to update files, by substituting the first executable file 34 with the second executable file 44 in the system 10. Activating module 48 in the second executable file 44 renders the same functions as activating module 40 in the first executable file 34. Terminating module 50 and terminating module 42 serve the same function.

In addition, second executable file 44 further comprises a communications module and a download module, which renders the same function as the communication module 36 and download module 38 in the first executable file 34.

Consequently, system 10 can update the second executable file 44 by executing method 11.

When system 10 executes first executable file 34, system 10 updates the first executable file 34 with the second executable file 44, then proceeds to execute the second executable file 44 after the update. An automatic update of the application in the system 10 allows for better performance without requests having to be made manually by users.

After an automatic update of executable file 44, server 12 sends a notification to client 14; information that the executable file 44 has been updated.

Figure 7:
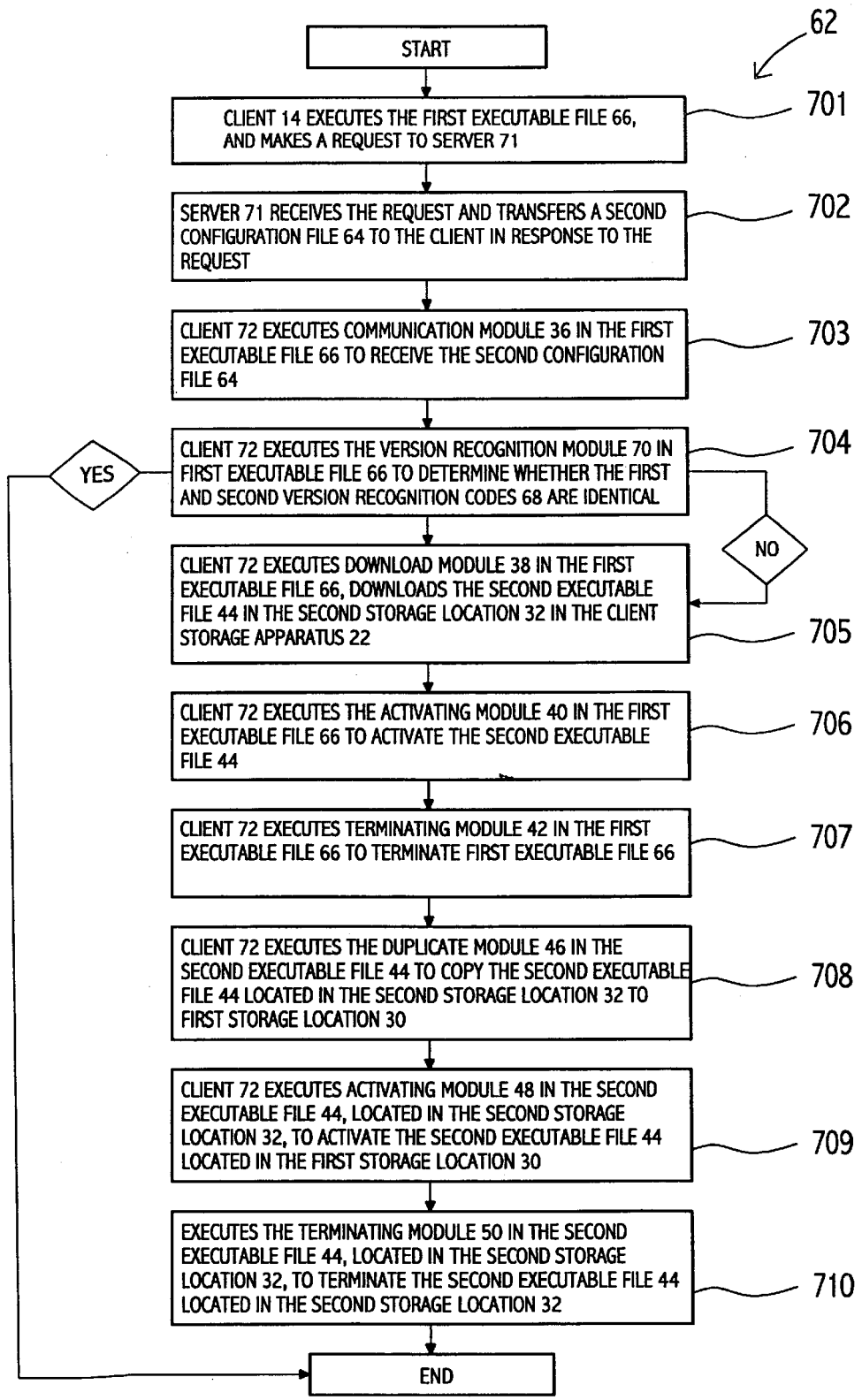
FIG. 7 illustrates a method schematic diagram of the second preferred embodiment according to the invention.
Figure 8:
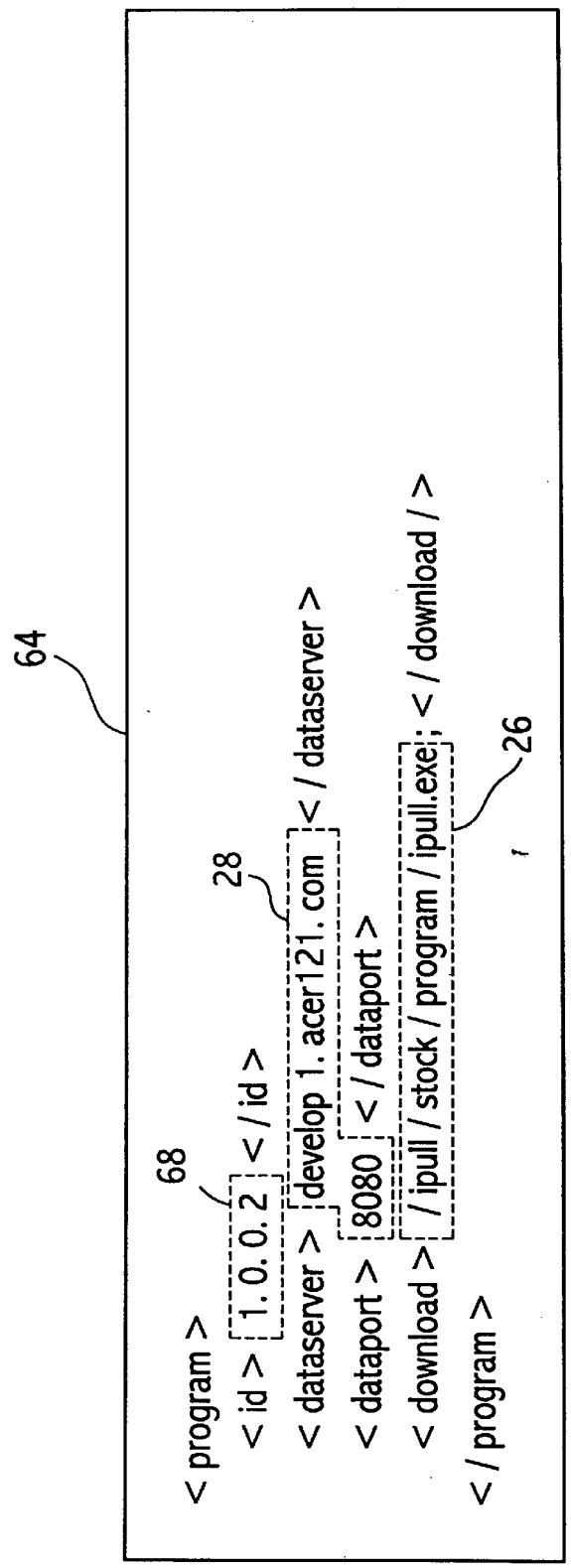
FIG. 8 illustrates a diagram of a system configuration file according to the invention as shown in FIG. 6.
Figure 9:
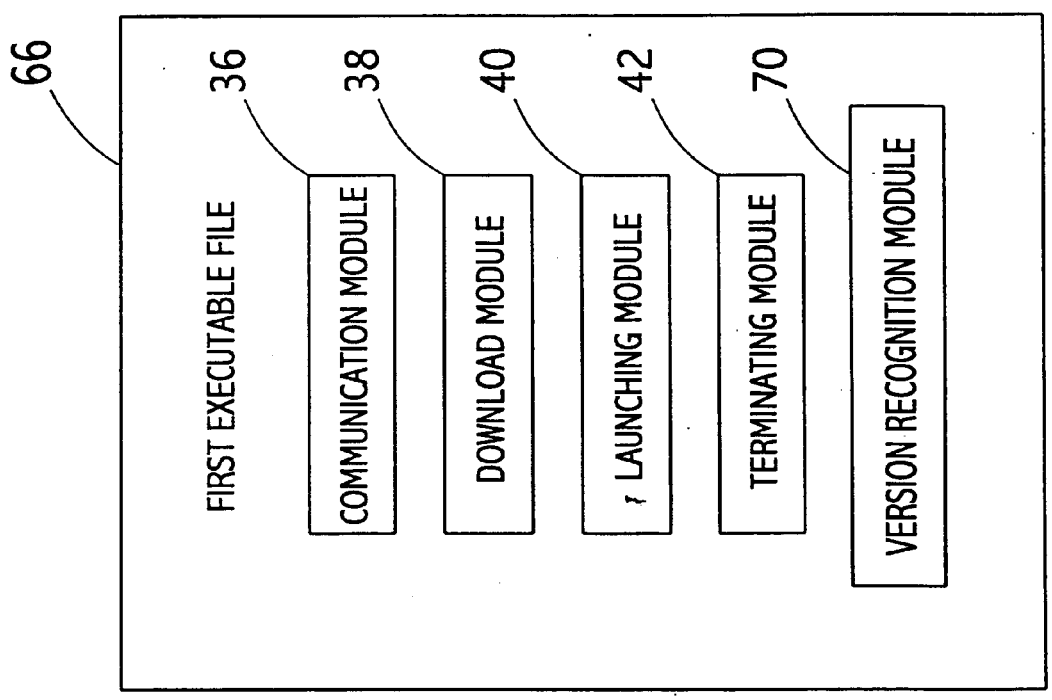
FIG. 9 illustrates a diagram of the first executable file according to the invention as shown in FIG. 6.

Referring to the embodiments shown from FIG. 6 to FIG. 9, FIG. 6 illustrates a schematic diagram of system 60 of the second preferred embodiment. FIG. 7 illustrates a schematic diagram of method 62 from the second preferred embodiment and FIG. 8 illustrates a diagram of configuration file 64 of the system 60, FIG. 9 illustrates a diagram of the first executable file 66 from the system 60 according to the invention.

The difference between system 60 and system 10 is that server 12 comprises a plurality of second configuration files 64, wherein each second configuration file 64 further comprises a second version recognition code 68, which correspond to second executable files 44.

A first configuration file (not shown in the drawings), comprising a first program version recognition code (not shown in the drawings) is stored at client 14. The first program version recognition code comprises a first executable file 34 which has a version recognition module 70 used to determine whether the first version recognition code and the second version recognition code 68 are identical.

As shown in FIG. 7, client 14 executes the first executable file 66, and makes a request to server 71 at step 701. Server 71 receives the request and transfers a second configuration file 64 to the client in response to the request at step 702. Client 72 then executes the following steps.

At step 703, client 72 executes communication module 36 in the first executable file 66 to receive the second configuration file 64.

At step 704, client 72 executes the version recognition module 70 in the first executable file 66 to determine whether the first version recognition code and the second version recognition code 68 are identical. If yes, the method 62 is terminated and the execution of the first executable file 66 continued. If not, then step 705 is executed.

At step 705, client 72 executes download module 38 in the first executable file 66, links to storage apparatus 20 or 24 which corresponds to file address 28, and downloads the second executable file 44 according to the file address 28 in the second configuration file 64. The client 72 then stores the second executable file 44 in the second storage location 32 in the client storage apparatus 22.

At step 706, client 72 executes the activating module 40 in the first executable file 66 to activate the second executable file 44.

At step 707, client 72 executes terminating module 42 in the first executable file 66 to terminate first executable file 66.

At step 708, client 72 executes the duplicate module 46 in the second executable file 44 to copy the second executable file 44 located in the second storage location 32 to first storage location 30.

At step 709, client 72 executes activating module 48 in the second executable file 44, located in the second storage location 32, to activate the second executable file 44 located in the first storage location At step 710, executes the terminating module 50 in the second executable file 44, located in the second storage location 32, to terminate the second executable file 44 located in the second storage location 32.

The main distinction between method 62 and method 11 is that the method 62 uses version recognition code to determine if the second executable file is the newer version. It then proceeds to an application update provided the second executable file 44 is newer than the first executable file 34. If the second executable file 44 is not newer than the first executable file 66, client 72 continues to execute the first executable file 66.

As shown in FIG. 8, version recognition code can be represented as a serial number, or alternatively it can be the time of the application update. The later the update time the newer the version is.

At step 707, terminating module 50 in the second executable file 44 can also be executed to terminate the first executable file 66. Step 710 can also involve executing the second executable file 44 located in the first storage location 30 to terminate the second executable file 44 located in the second storage location 32.

When first and second version recognition code are different and the first executable file 66 has been updated as a second executable file 44, client 72 stores received second configuration file 64 in the client storage apparatus 22 replacing the first configuration file.

Second configuration file 64 can exist as an independent file stored in the client 72 or stored in the operating system's registration file.

Activating module 48 in the second executable file 44 renders the same functions as the activating module 40 in the first executable file 66. Terminating module 50 and terminating module 42 also delivers the same functions. The second executable file 44 further comprises a communication module, a version recognition module, and a download module, which renders the same functions as the communication module 36, version recognition module 70, and download module 38 in the first executable file 66. Consequently, system 60 can update the second executable file 44 by iterating method 62.

When system 60 executes the first executable file 66, system 60 updates the first executable file 66 with the second executable file 44, and then continues to execute the second executable file 44. An automatic update of the application in the system 60 allows better performance without the need for a manual request from the user.

After an automatic update of the executable file, server 71 sends a notification to client 72; information that the executable file has been updated.

Figure 10:
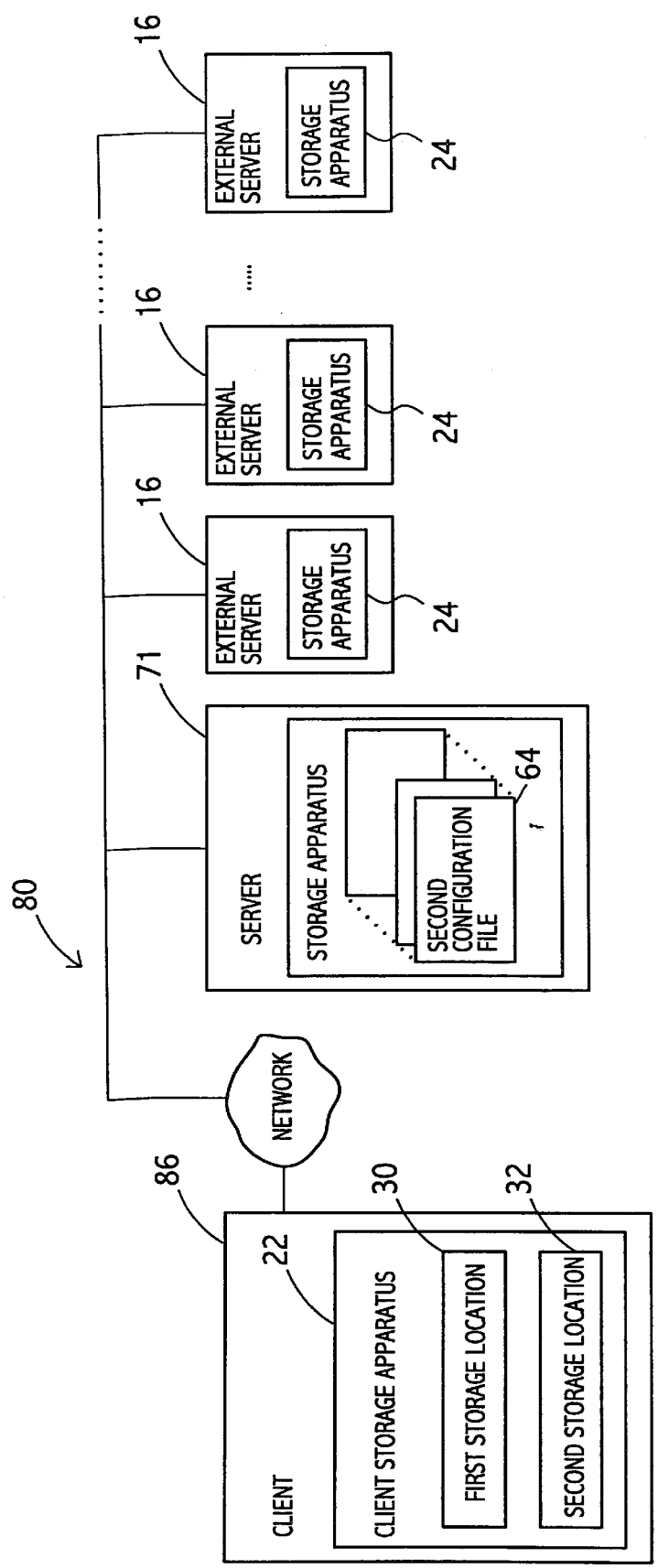
FIG. 10 illustrates a system schematic diagram of the third preferred embodiment according to the invention.
Figure 11:
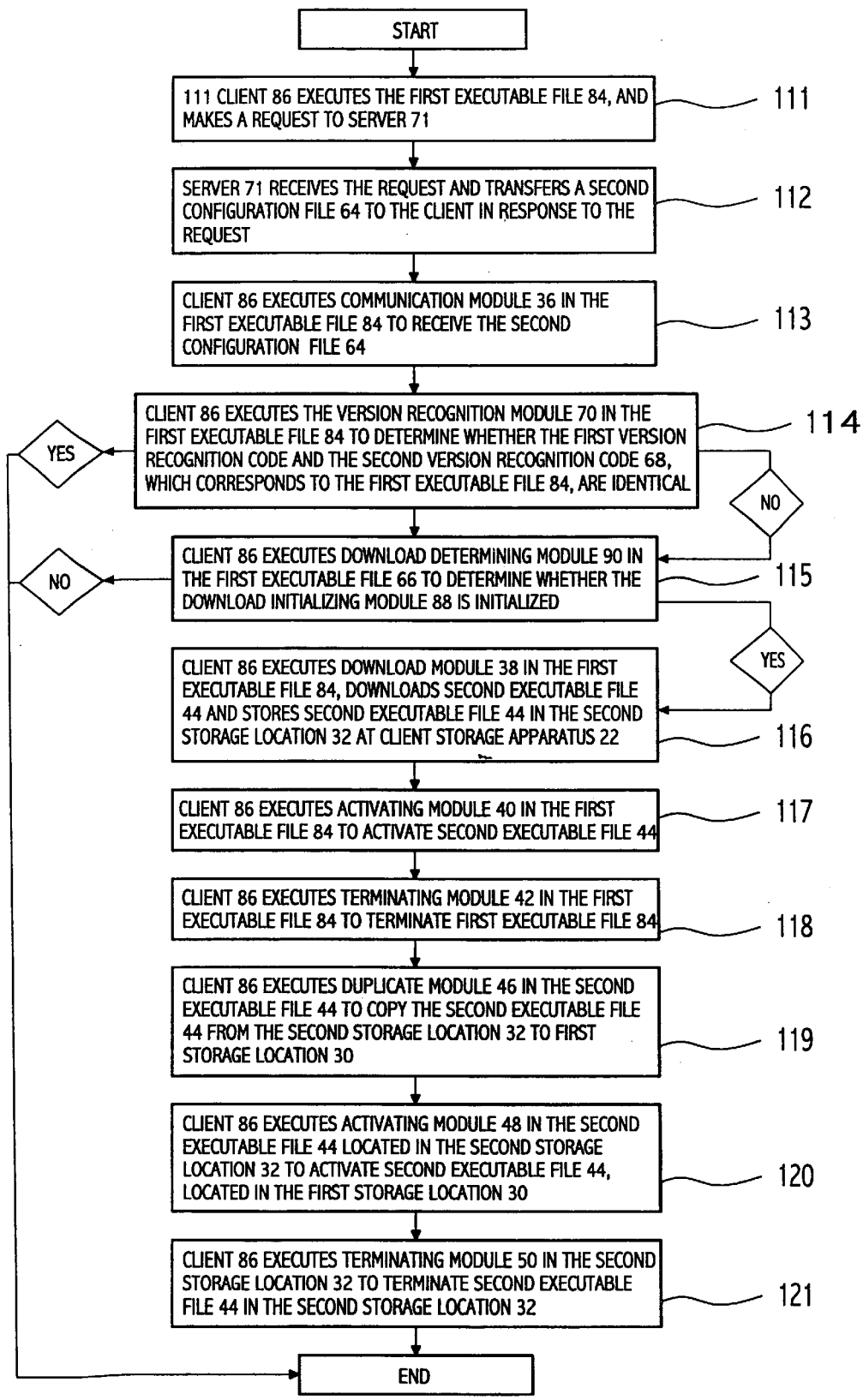
FIG. 11 illustrates a method schematic diagram of the second preferred embodiment according to the invention.
Figure 12:
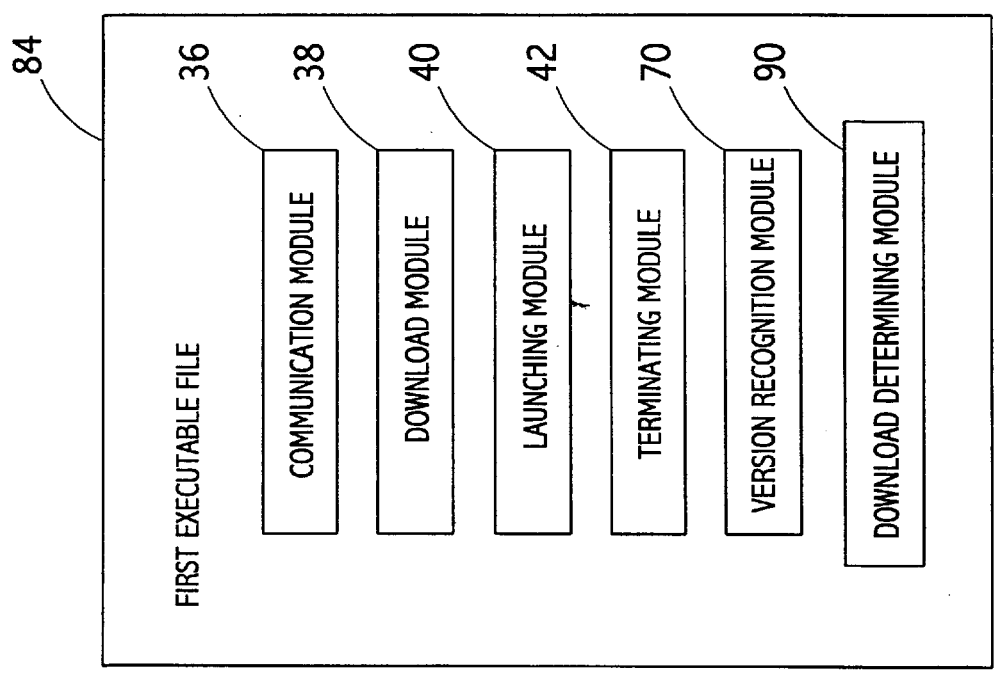
FIG. 12 illustrates a diagram of first executable file according to the invention as shown in FIG. 10.

Referring to the embodiments shown from FIG. 10 to FIG. 12, FIG. 10 illustrates a schematic diagram of the system 80 of the third preferred embodiment. FIG. 11 illustrates a method 82 schematic diagram of the third preferred embodiment. FIG. 12 illustrates a diagram of a first executable file 84 of the system 80. The difference between system 80 and system 60 lies in the fact that the first executable file 84 stored in client 86 further comprises a download initializing module 88, used to initialize a download module 38 and a download determining module 90 used to determine whether the download initializing module 88 is initialized or not.

As shown in FIG. 11, client 86 executes the first executable file 84, and makes a request to server 71 at step 111. At step 112, server 71 receives the request and transfers a second configuration file 64 to the client in response to the request. Client 86 executes the following steps.

At step 113, client 86 executes communication module 36 in the first executable file 84 to receive the second configuration file 64.

At step 114, client 86 executes the version recognition module 70 in the first executable file 84 to determine whether the first version recognition code and the second version recognition code 68, which corresponds to the first executable file 84, are identical. If yes, then method 82 is terminated and execution of the first executable file 84 continued, if not, then step 115 is executed.

At step 115, client 86 executes download determining module 90 in the first executable file 66 to determine whether the download initializing module 88 is initialized, if yes, step 116 is executed; if not, method 82 is terminated and the first executable file 84 executed.

At step 116, client 86 executes download module 38 in the first executable file 84 according to the file address 28 in the second configuration file 64. Then links to storage apparatus 20 or 24, which corresponds to file address 28, downloads second executable file 44 and stores second executable file 44 in the second storage location 32 at client storage apparatus 22.

At step 117, client 86 executes activating module 40 in the first executable file 84 to activate second executable file 44.

At step 118, client 86 executes terminating module 42 in the first executable file 84 to terminate first executable file 84.

At step 119, client 86 executes duplicate module 46 in the second executable file 44 to copy the second executable file 44 from the second storage location 32 to first storage location 30.

At step 120, client 86 executes activating module 48 in the second executable file 44 located in the second storage location 32 to activate second executable file 44, located in the first storage location 30.

At step 121, client 86 executes terminating module 50 in the second executable file 44 located in the second storage location 32 to terminate second executable file 44 in the second storage location 32.

The main distinction between method 82 and method 62 is that, when it is determined that the second executable file 44 is a newer version, client 86 executes version recognition module 90 in the first executable file 84. It also enables a dialogue box that asks users at client 86 whether to proceed with the application update. If users decide to update the application, download-initializing module 88 will then be initialized to initialize download module 38 to execute step 116. If users decide not to update the application, download-initializing module 88 will not be initialized and client 86 will continue to execute the first executable file 84. Therefore client 86 only updates the application only where the second executable file 44 is newer than the first executable file 84 for updating the application and the user decides to update.

An alternative to step 118 is to execute terminating module 50 in the second executable file 44 to terminate the first executable file 84. For step 121, an alternative is to execute the second executable file 44 in the first storage location 30. This terminates the second executable file 44 located in the second storage location 32.

When the first version recognition code and the second version recognition code 68 are different and the first executable file 84 has been updated as a second executable file 44, client 72 stores the received second configuration file 64 in the client storage apparatus 22 in place of the first configuration file.

Second configuration file 64 can exist as an independent file stored in the client 86 or stored in the operating system's registration file.

When the first version recognition code and the second version recognition code 68 differ and users decide not to proceed a version update of the application, the download-initializing module 88 will not initialize the download module 38. As a result the client 86 will not substitute the first configuration file with second configuration file 64.

Activating module 48 in the second executable file 44 renders the same functions as activating module 40 in the first executable file 84. Terminating module 50 and terminating module 42 serve the same functions. In addition, second executable file 44 further comprises a communication module, a version recognition module and a download module, which render the same function as the communication module 36, version recognition module 70 and download module 38 in the first executable file 84. Consequently, system 80 can update second executable file 44 by executing method 82.

When system 80 executes the first executable file 84, system 80 updates the first executable file 84 with the second executable file 44, and then executes the second executable file 44. The system then asks the user if he/she wishes to update the application so as to render better performance.

Figure 13:
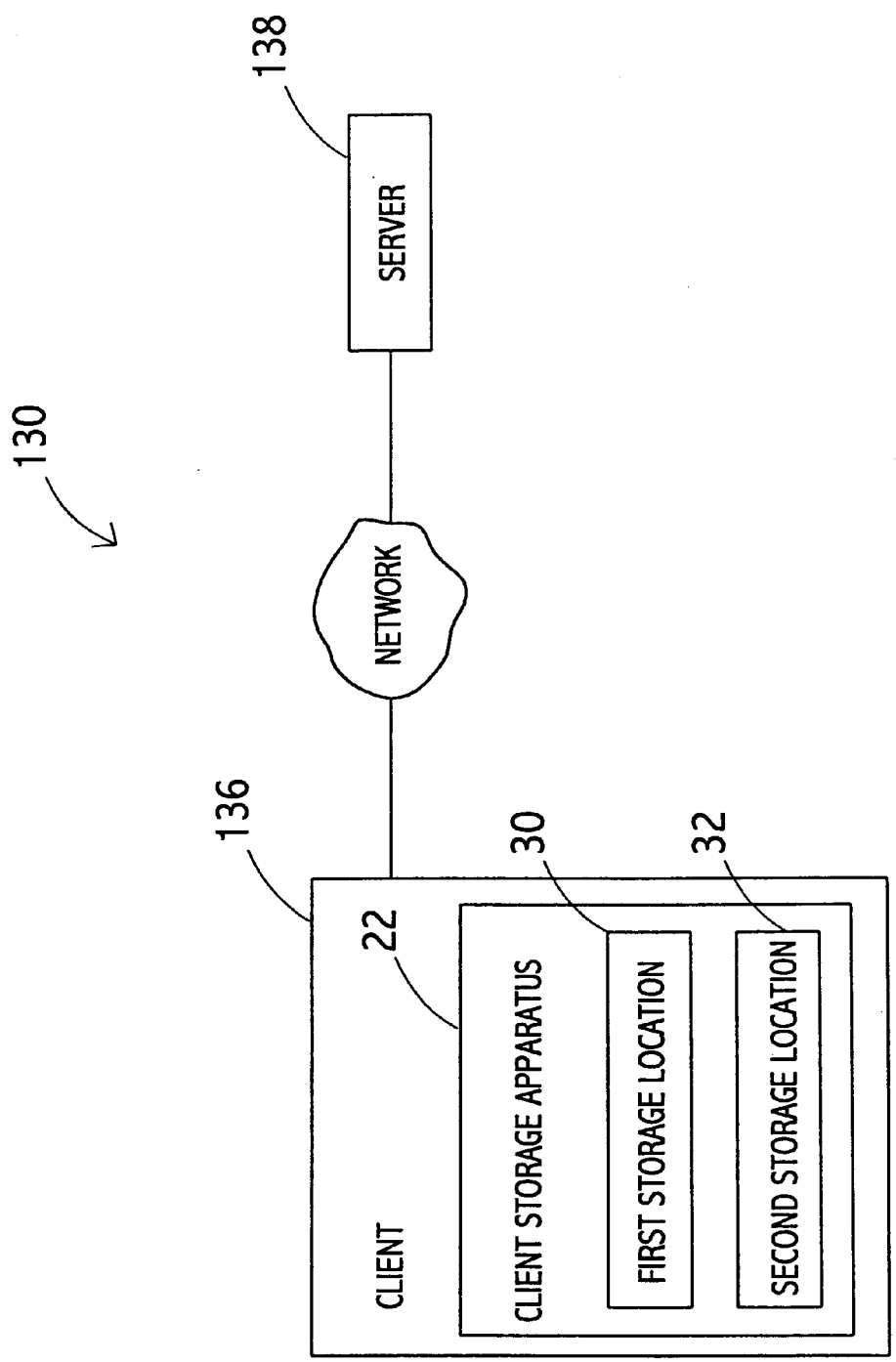
FIG. 13 illustrates a system schematic diagram of the fourth preferred embodiment according to the invention.
Figure 14:
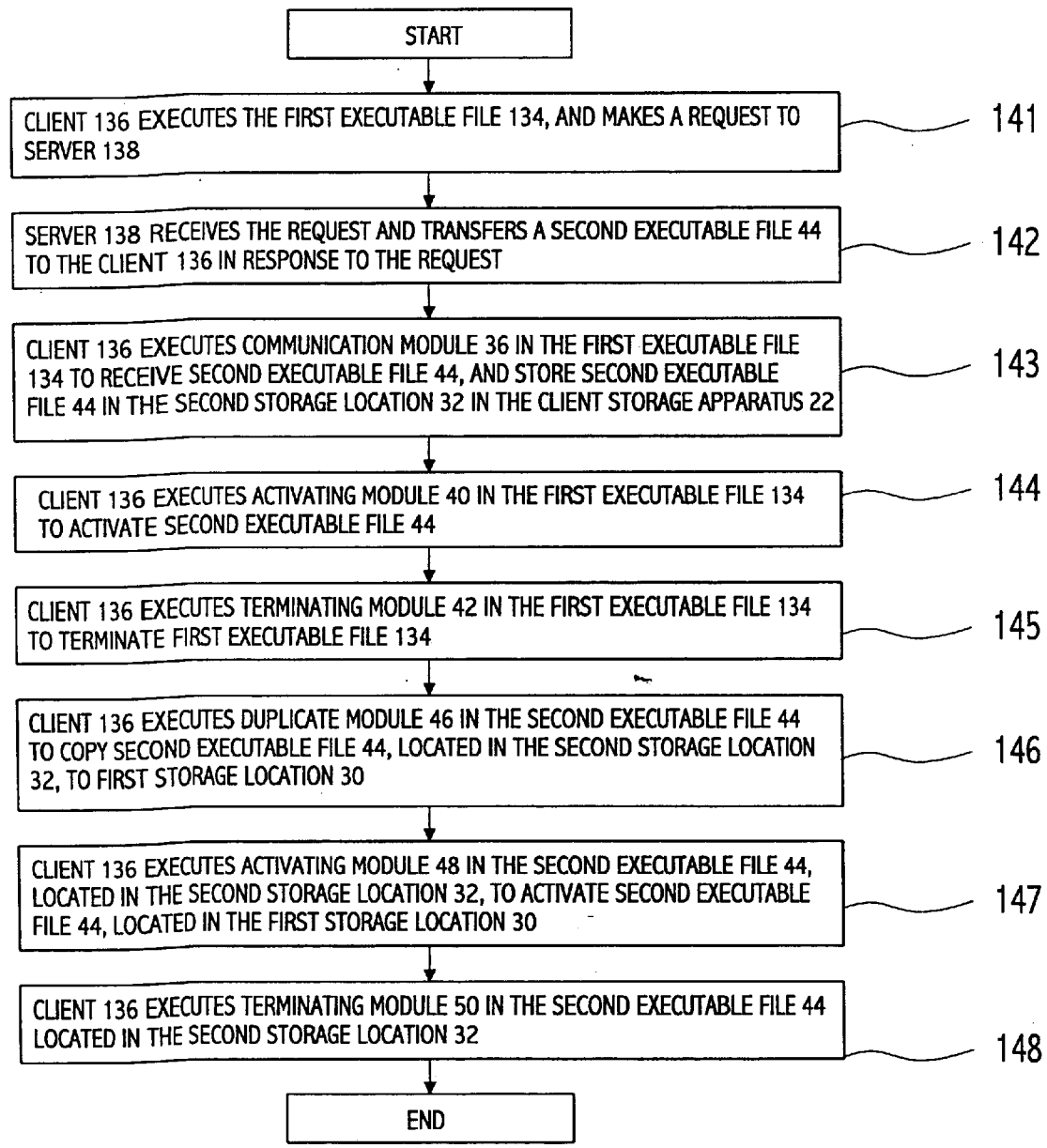
FIG. 14 illustrates a method schematic diagram of the fourth preferred embodiment according to the invention.
Figure 15:
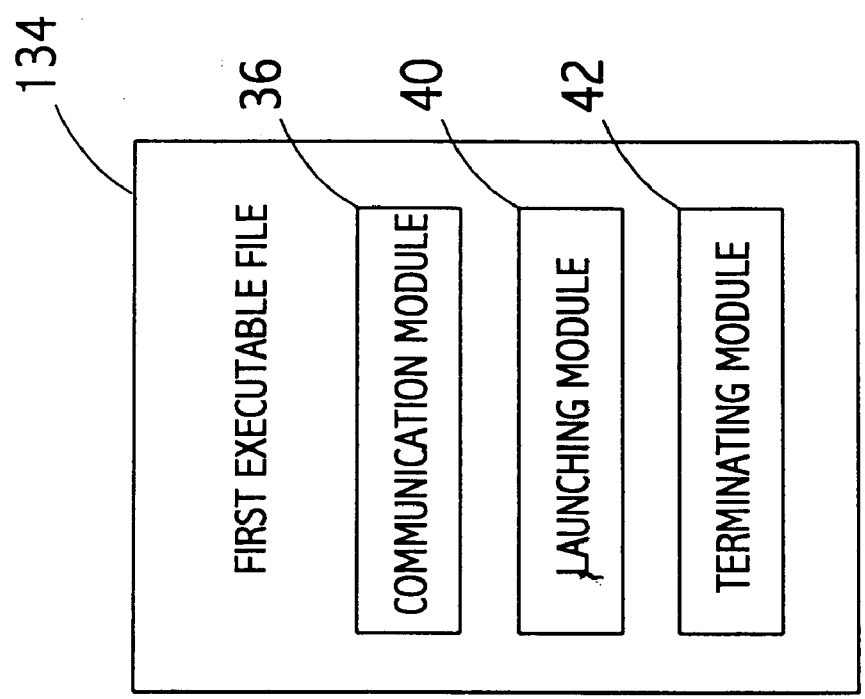
FIG. 15 illustrates a diagram of first executable file according to the invention as shown in FIG. 13.

Referring to the embodiments shown from FIG. 13 to FIG. 15, FIG. 13 illustrates a schematic diagram of the system 130 of the fourth preferred embodiment. FIG. 14 illustrates a method 132 schematic diagram of the fourth preferred embodiment. FIG. 15 illustrates a diagram of first executable file 134 of the system 130. The difference between system 130 and system 10 lies in the fact that server 138 in the new executable file is transferred to the client 136 for an application update. Consequently, the first executable file 134 of the client 136 in the system 130 does not have to include a download module. The second executable file 44 is stored in the server 138.

As shown in FIG. 14, client 136 executes the first executable file 134, and makes a request to server 138 at step 141. At step 142, server 138 receives the request and transfers a second executable file 44 to the client 136 in response to the request at step 142. Client 136 executes the following steps.

At step 143, client 136 executes communication module 36 in the first executable file 134 to receive second executable file 44, and store second executable file 44 in the second storage location 32 in the client storage apparatus 22.

At step 144, client 136 executes activating module 40 in the first executable file 134 to activate second executable file 44.

At step 145, client 136 executes terminating module 42 in the first executable file 134 to terminate first executable file 134.

At step 146, client 136 executes duplicate module 46 in the second executable file 44 to copy second executable file 44, located in the second storage location 32, to first storage location 30.

At step 147, client 136 executes activating module 48 in the second executable file 44, located in the second storage location 32, to activate second executable file 44, located in the first storage location 30.

At step 148, client 136 executes terminating module 50 in the second executable file 44 located in the second storage location 32 to terminate second executable file 44 located in the second storage location 32.

An alternative to step 145 is to execute terminating module 50 in the second executable file 44 to terminate the first executable file 84. For step 148, an alternative is to execute the second executable file 44 in the first storage location 30. This terminates the second executable file 44 located in the second storage location 32.

Method 132 is used to make updates by substituting the first executable file 134 with the second executable file 44 in the system 130. Activating module 48 in the second executable file 44 renders the same functions as the activating module 40 in the first executable file 134. Terminating module 50 and terminating module 42 serve the same functions. In addition, the second executable file 44 further comprises a communication module, which renders the same function as the communication module 36 in the first executable file 134. Consequently, system 10 can update second executable file 44 by executing method 132.

When system 130 executes the first executable file 134, system 130 updates the first executable file 134 with the second executable file 44, then continues to execute the second executable file 44. An automatic update of the application in the system 130 can be completed allowing better performance, without a request from a user.

After an automatic update of the executable file, server 138 sends a notification to client 136; information that the executable file has been updated.

The main different between the invention and prior art is that the system according to the invention can update an executing executable file. When the executable file in the server is updated, users do not have to terminate the executing executable file, on the contrary it can update an executing executable file. The system according to the invention is optimized where the size of the executable file is not large or data transmission is completed via broadband network.

From a user's perspective, the invention provides feature to update applications real-time and automatically without requiring the extra time and effort of a manual update. From the perspective of the providers of the executable files, an automatic update of the executable file assures that all executable files used by users over the network are up to date. In addition, it also offers features for executable file providers to update executable files real-time after application debugging is completed.

Having described an exemplary embodiment, it should be apparent to people skilled in the art that changes may be made to the embodiment described without departing from the spirit and scope of the invention.

What is claimed is:

1. A method for updating an executing executable file, comprising executing a first executable file stored in first storage location at client and making a request;

receiving the request at server, and transferring a configuration file to the client in response to the request, wherein the configuration file comprises a executable file name, and file address which corresponds to a storage apparatus, wherein a second executable file corresponds to the executable file name is stored in the storage apparatus;

executing the following steps at the client:

(a) receiving the configuration file from first executable file;

(b) linking to the storage apparatus, which corresponds to the file address from the first executable file according to the file address in the configuration file, downloading the second executable file and storing the second executable file in a second storage location (c) activating the second executable file from the first executable file;

(d) terminating the first executable file;

(e) duplicating the second executable file stored in the second storage location to the first storage location from the second executable file;

(f) activating the second executable file stored in the first storage location from second executable file stored in the second storage location; and (g) terminating the second executable file stored in the second storage location.

2. The method according to claim 1, wherein the first executable file terminates automatically at step (d).

3. The method according to claim 1, wherein the second executable file terminates the first executable file at step (d).

4. The method according to claim 1, wherein the second executable file stored in the second storage location terminates automatically at step (g).

5. The method according to claim 1, wherein the second executable file stored in the first storage location terminates the second executable file stored in the second storage location at step (g).

6. The method according to claim 1, wherein the storage apparatus is an external server.

7. The method according to claim 1, wherein the server further comprises the storage apparatus.

8. The method according to claim 1, wherein the configuration file is stored in the client.

9. A method for updating an executing executable file, comprising:

executing a first executable file stored in first storage location at client and making a request;

receiving the request at server, and transferring second executable file to the client in response to the request;

executing the following steps at the client:

(a) linking to the storage apparatus, which corresponds to the file address from the first executable file according to the file address in the configuration file, downloading the second executable file and storing the second executable file in a second storage location;

(b) activating the second executable file from the first executable file;

(c) terminating the first executable file;

(d) duplicating the second executable file stored in the second storage location to the first storage location from the second executable file;

(e) activating the second executable file stored in the first storage location from second executable file stored in the second storage location; and (f) terminating the second executable file stored in the second storage location.

10. The method according to claim 9, wherein the first executable file terminates automatically at step (c).

11. The method according to claim 9, wherein the second executable file terminates the first executable file at step (C).

12. The method according to claim 9, wherein the second executable file stored in the second storage location terminates automatically at step (f).

13. The method according to claim 9, wherein the second executable file stored in the first storage location terminates the second executable file stored in the second storage location at step (f).

14. A method for updating an executing executable file, comprising:

executing a first executable file stored in first storage location at client and making a request, wherein first configuration file is stored in the client comprising a first program version recognition code, which corresponds to the first executable file;

receiving the request at server and transferring a second configuration file to the client in response to the request, wherein the second configuration file comprises an executable file name, a file address and a second version recognition code , and wherein the file address corresponds to a storage apparatus and the second executable file which corresponds to the executable file name is stored in the storage apparatus and the second version recognition code corresponds to the second executable file;

executing the following steps at the client:

(a) receiving the configuration file from the first executable file;

(b) determining whether the second version recognition and the first version recognition code are identical from the first executable file, if yes, then terminating the steps, if not, then proceeding to step (c);

(c) linking to the storage apparatus, which corresponds to the file address from the first executable file according to the file address in the second configuration file and downloading the second executable file and storing the second executable file in a second storage location;

(d) activating the second executable file from the first executable file;

(e) terminating the first executable file;

(f) duplicating the second executable fire stored in the second storage location to the first storage location from the second executable file;

(g) activating the second executable file stored in the first storage location from second executable file stored in the second storage location; and (h) terminating the second executable file stored in the second storage location.

15. The method according to claim 14, wherein the first executable file terminates automatically at step (e).

16. The method according to claim 14, wherein the second executable file terminates the first executable file at step (e).

17. The method according to claim 14, wherein the second executable file stored in the second storage location terminates automatically at step (h).

18. The method according to claim 14, wherein the second executable file stored in the first storage location terminates the second executable file stored in the second storage location at step (h).

19. The method according to claim 14, wherein the storage apparatus is an external server.

20. The method according to claim 14, wherein the server further comprises the storage apparatus.

21. The method according to claim 14, wherein the client substitute the first configuration file with the second configuration file when the second version recognition code is different from the first version recognition code.

22. A method for updating an executing executable file, comprising:

executing a first executable file stored in first storage location at client and making a request, wherein the client comprises a download initializing module use for initializing the download module and a first configuration file comprising a first program version recognition code which corresponds to the first executable file;

receiving the request at server and transferring a second configuration file to the client in response to the request, wherein the second configuration file comprises an executable file name, a file address and a second version recognition code, and wherein the file address corresponds to a storage apparatus and the second executable file which corresponds to the executable file name is stored in the storage apparatus and the second version recognition code corresponds to the second executable file;

executing the following steps at the client:
(a) receiving the configuration file from the first executable file;
(b) determining whether the second version recognition code and the first version recognition code are identical from the first executable file, if yes, then terminating the steps, if not, then proceeding to step (c);
(c) determining whether the download initializing module is initialized from the first executable file, if yes, then proceeding to (d), if not, then terminates the steps;
(d) linking to the storage apparatus which corresponds to the file address from the first executable file according to the file address in the second configuration file, downloading the second executable file and storing the second executable file in a second storage location;
(e) activating the second executable file from the first executable file;
(f) terminating the first executable file;
(g) duplicating the second executable file stored in the second storage location to the first storage location from the second executable file;
(h) activating the second executable file stored in the first storage location from second executable file stored in the second storage location; and
(i) terminating the second executable file stored in the second storage location.

23. The method according to claim 22, wherein the first executable file terminates automatically at step (f).

24. The method according to claim 22, wherein the second executable file terminates the first executable file at step (f).

25. The method according to claim 22, wherein the second executable file stored in the second storage location terminates automatically at step (i).

26. The method according to claim 22, wherein the second executable file stored in the first storage location terminates the second executable file stored in the second storage location at step (i).

27. The method according to claim 22, wherein the storage apparatus is an external server.

28. The method according to claim 22, wherein the server further comprises the storage apparatus.

29. The method according to claim 22, wherein the client substitute the first configuration file with the second configuration file when the second version recognition code is different from the first version recognition code and the download module is initialized by the download initializing module.

30. A system for updating an executing executable file, comprising a server having a plurality of configuration files, wherein each configuration file comprises a executable file name, and file address which corresponds to a storage apparatus, wherein a second executable file corresponds to the executable file name is stored in the storage apparatus, and the second executable file comprises:

a duplicating module used for duplicating the second executable file;
a activating module used for activating duplicated second executable file;
a terminating module used for terminating the executing of the second executable file; and a client comprising:
a client storage apparatus; and
a first executable file stored in a first storage location at the client storage apparatus, wherein the first executable file comprises:
a communication module used for receiving the configuration file from the server;
a download module used for linking to the storage apparatus which corresponds to the file address from the first executable file according to the file address in the configuration file, downloading the second executable file and storing the second executable file in a second storage location at the client;
a activating module used for activating the second executable file; and
a terminating module used for terminating the execution of first executable file.

31. The system according to claim 30, wherein terminating module in the second executable file is used for terminating the execution of the first executable file.

32. The system according to claim 30, wherein the storage apparatus is an external server.

33. The system according to claim 30, wherein the server further comprises the storage apparatus.

34. The system according to claim 30, wherein received configuration file is stored in the client.

35. A system for updating an executing executable file, comprising a server having a second executable file, which comprises:

a duplicating module used for duplicating the second executable file;
a activating module used for activating duplicated second executable tile;
a terminating module used for terminating the executing of the second executable file; and a client comprising:
a client storage apparatus; and
a first executable file stored in a first storage location at the client storage apparatus, wherein the first executable file comprises:
a communication module used for receiving the second executable file from the server and storing the second executable file in a second storage location at the client;
a activating module used for activating the second executable file; and
a terminating module used for terminating the execution of first executable file.

36. The system according to claim 35, wherein terminating module in the second executable file is used for terminating the execution of the first executable file.

37. A system for updating an executing executable file, comprising a server having a plurality of second configuration files, wherein each configuration file comprises a executable file name, a second version recognition code, and file address which corresponds to a storage apparatus, wherein a second executable file corresponds to the executable file name is stored in the storage apparatus, a second version recognition code corresponds to the second executable file, and the second executable file comprises:

a duplicating module used for duplicating the second executable file;

a activating module used for activating duplicated second executable file;

a terminating module used for terminating the executing of the second executable file; and a client comprising:

a client storage apparatus;

a first configuration file stored at the client storage apparatus, which comprises a first program version recognition code; and a first executable file stored in a first storage location at the client storage apparatus, wherein the first program version recognition code corresponds to the first executable file, and the first executable file comprises:

a communication module used for receiving the second configuration file from the server;

a version recognition module used for determining whether the second version recognition code and the first version recognition code are identical from the first executable file a download module used for linking to the storage apparatus, which corresponds to the file address from the first executable file according to the file address in the second configuration file, and downloading the second executable file and stored the second executable file stored in a second storage location;

a activating module used for activating the second executable file; and a terminating module used for terminating the execution of first executable file.

38. The system according to claim 37, wherein terminating module in the second executable file is used for terminating the execution of the first executable file.

39. The system according to claim 37, wherein the storage apparatus is an external server.

40. The system according to claim 37, wherein the server further comprises the storage apparatus.

41. The system according to claim 37, wherein the client substitute the first configuration file with the second configuration file when the second version recognition code is different from the first version recognition code.

42. The system according to claim 37, wherein the first executable file further comprises a download initializing module used for initializing the download module.

43. The system according to claim 42, wherein the client substitute the first configuration file with the second configuration file when the second version recognition code is different from the first version recognition code and the download module is initialized by the download initializing module.

44. The system according to claim 42, wherein the first executable file further comprises a download-determining module used for determining whether the download-initializing module is initialized.

* * * * *